Jan. 28, 1969 L. A. PAPPAS 3,424,080
HYDRAULIC TIE ROD NUT
Filed Aug. 23, 1967

Inventor
Lambros A. Pappas
By Wallenstein, Spangenberg, Hattis & Strampel
Attys

United States Patent Office 3,424,080
Patented Jan. 28, 1969

3,424,080
HYDRAULIC TIE ROD NUT
Lambros A. Pappas, 6049 N. Richmond,
Chicago, Ill. 60645
Filed Aug. 23, 1967, Ser. No. 662,798
U.S. Cl. 100—214                    11 Claims
Int. Cl. B30b *15/00;* F16b *37/00*

ABSTRACT OF THE DISCLOSURE

A unitary hydraulic tie rod nut is provided for tensioning the tie rods of a power press, it having a pair of axially relatively movable members with one member only engageable with the frame of the press and the other threaded on the tie rod. It includes an expansible chamber supplied with hydraulic fluid pressure for moving the members apart to tension the tie rod, and shims are inserted between the two members for maintaining the tension in the tie rod when the hydraulic fluid pressure is released.

---

Hydraulic tie rod nuts are known in the prior art but these leave much to be desired. One arrangement is complicated requiring double screw thread operations and in another arrangement it is necessary to insert the shims between the nut and the frame.

The principal object of this invention is to provide a hydraulic tie rod nut structure which is simpler and more reliable than those of the prior art and which can be utilized under circumstances where those of the prior art cannot be used. For example, the hydraulic tie rod nut of this invention can be utilized where the frame is recessed about the tie rod since the shims are inserted between the two members thereof and not between the nut and the frame. Other objects and advantages of this invention will become apparent to those skilled in the art upon reference to the accompanying specification, claims and drawing, in which:

Figure 1:
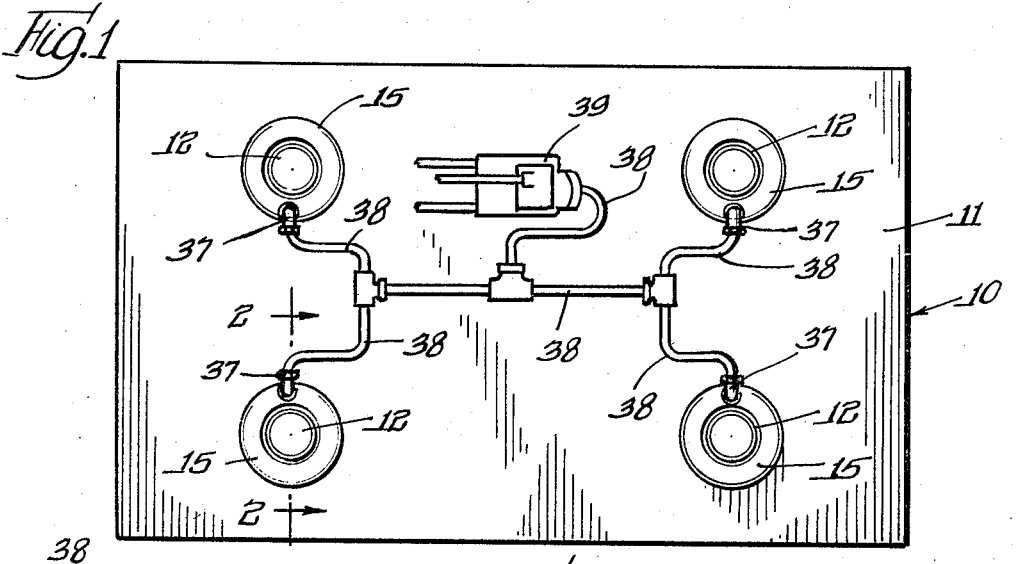
FIG. 1 is a top plan view of a power press having the hydraulic tie rod nuts of this invention applied to the tie rods thereof.
Figure 2:
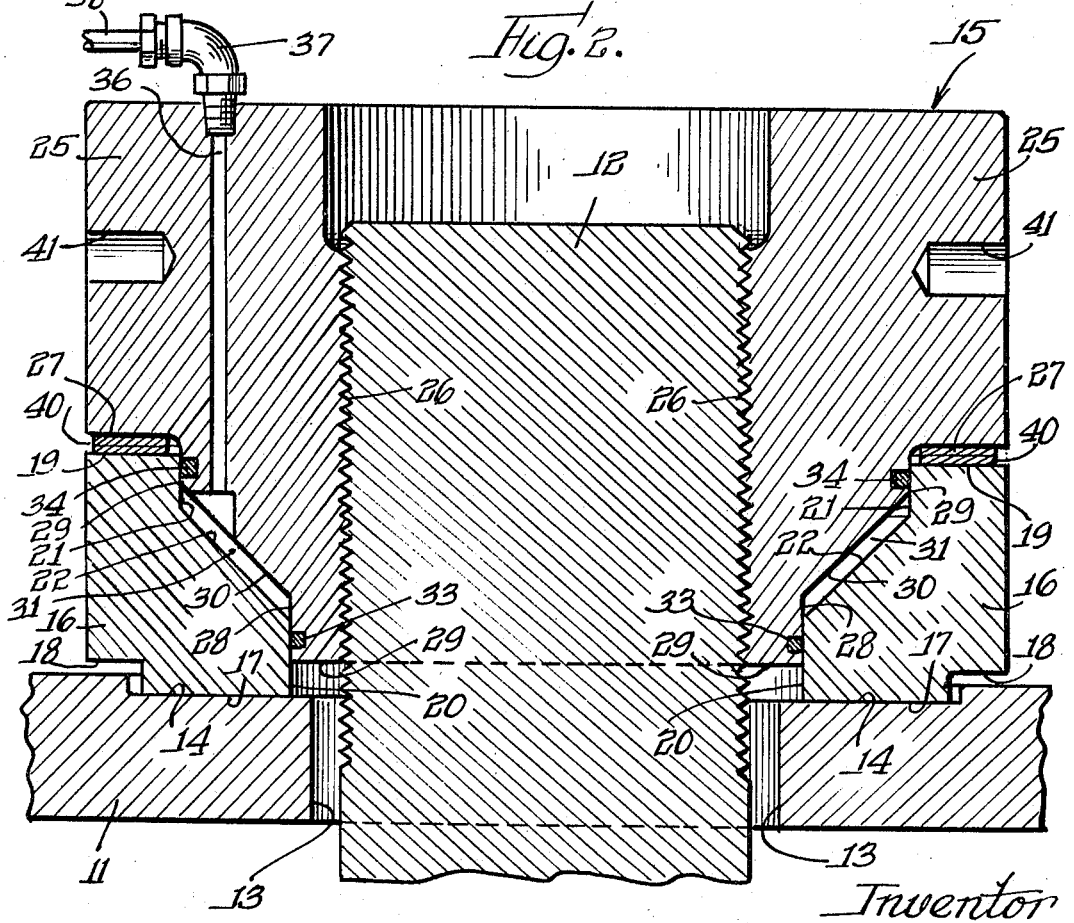
FIG. 2 is an enlarged sectional view of one of the tie rod nuts of this invention taken substantially along the line 2—2 of FIG. 1.

A conventional power press having tie rods is generally designated at 10 in FIG. 1. The power press includes a frame which normally consists of a bed, uprights and a crown 11 which are held together under compression by tie rods 12. As shown in FIG. 2, the tie rods 12 have screw threaded ends extending through openings 13 in the frame such as openings 13 in the crown 11 of the press. Normally the frame or crown is machined flat and square as illustrated at 14 and normally such machining is of lesser diameter when the usual mechanical tie rod nuts are used than when hydraulic tie rod nuts are used, the latter normally being of greater diameter than the former.

A unitary hydraulic tie rod nut structure of this invention is generally designated at 15. It encompasses the screw threaded ends of each of the tie rods and it includes a pair of axially relatively movable annular members 16 and 25. One axial end 17 of the annular member 16 is adapted to engage the frame or crown 11 at 14 and where the diameter of the annular member 16 is greater than the diameter of the machined portion 14, the annular member 16 may have its said one end 17 undercut as illustrated at 18 so that the annular member 16 may seat flush upon the machined portion 14. This enables installation of the hydraulic tie rod nuts of this invention on existing presses in the field since the diameter of the end 17 thereof may be made to suit the machined portion 14 of the crown of such presses. The other axial end of the annular member 16 is provided with an annular outwardly exposed seat 19. The annular member 16 is provided adjacent its axial end 17 with a relatively small diameter internal cylindrical surface 20 and it is also provided adjacent the seat 19 with a relatively large diameter internal cylindrical surface 21. It is further provided with an internal wall surface 22 between the internal cylindrical surfaces 20 and 21 which is preferably conical.

The other annular member 25 is provided with internal screw threads 26 which are adapted to screw threadedly engage the screw threaded end of the tie rod 12. The length of the screw threads 26 is substantially the same as the length of the threads on a conventional tie rod nut. Towards this end the threads 26 are recessed from the end of the nut so that the nut is directly applicable to the existing or conventional tie rods and eliminates the need for substitute tie rods. The annular member 25 is provided intermediate its axial ends with an annular radially outwardly exposed seat 27 which is adapted to engage the annular seat 19 of the annular member 16. The annular member 25 also includes a relatively small diameter external cylindrical surface 28 adjacent one axial end 29 thereof which is received in the relatively small diameter internal cylindrical surface 20 of the annular member 16. The annular member 25 is further provided with a large diameter external cylindrical surface 29 adjacent the annular seat 27 which is received in the relatively large diameter internal cylindrical surface 27 of the annular member 16. The annular member 25 has an external wall surface 30 between the external cylindrical surfaces 28 and 29 and this wall surface 30, which is also preferably conical, faces the internal wall surface 22 of the member 16 to define an axially expansible chamber 31 therebetween. When the annular seat 27 of the member 25 engages the annular seat 19 of the member 16, this engagement prevents complete collapsing of the axially expansible chamber 31 and prevents the axial end 29 of the member 25 from engaging the frame 11. The configuration of the lower end of the annular member 25, beginning with the relatively small diameter cylindrical surface 28 which merges with the conical surface 30, provides a gradually increasing cross section in member 25. This configuration improves stress distribution in the threads at the lower end of the member 25. End surface 29 is unrestrained and free to move downwardly permitting the threads to be more uniformly loaded.

Sealing means 33 are provided for the relatively small diameter cylindrical surfaces 20 and 28 and sealing means 34 are provided for the relatively large cylindrical surfaces 21 and 29 for sealing the axially expansible chamber 31. These sealing means may be of conventional hydraulic seals received within annular grooves in the annular member 25. These hydraulic seals 33 and 34, in addition to sealing hydraulic fluid pressure within the expansible chamber 31 also permit relative axial movement of the annular members 16 and 25 and relative rotatable movement of the annular members 16 and 25. Hydraulic fluid pressure is supplied to the axially expansible chamber 31 by a passage 36 extending from the outer surface of the member 25 to the chamber 31. The location of the passage 36 is such as to facilitate bleeding of entrapped air from the chamber 31. Hydraulic fluid pressure is supplied to and relieved from the chamber 31 and passage 36 through a fitting 37 and conduits 38 from a hydraulic fluid pump 39 which may be detachably mounted on the crown or frame 11 of the power press.

In utilizing the hydraulic tie rod nut structure 15 of this invention the structure is applied over the screw threaded end of the tie rod 12 and the annular member 25 is rotated about the tie rod 12 to engage the annular seats 19 and 27 and the axial end 17 of the member 16 against the surface 14 of the frame or crown 11 and the structure is drawn up tight. Hydraulic fluid pressure is then supplied to the axially expansible chamber 31 from the pump 39 to move axially the annular member 25 with respect to the annular member 16 which tensions the tie rod 12. Semicircular shims 40 are then inserted between the separated annular seats 19 and 27 and thereafter the hydraulic fluid pressure is relieved from the axially expansible chamber 31. The shims 40, therefore, operate to maintain the tension in the tie rod 12 even though the hydraulic pressure is relieved. When it is desired to release the tension on the tie rod 12, hydraulic fluid pressure is again applied to the axially expansible chamber 31 to axially move the annular member 25 with respect to the annular member 16 to allow removal of the shims 40. After the shims 40 are removed and the pressure released, the annular seats 19 and 27 engage, whereupon the tension in the tie rod 12 is relieved. The annular member 25 may be rotated and backed off with respect to the threaded end of the tie rod 12. To assist in rotation of the annular member 25 to take up or relieve the same with respect to the tie rod 12 the outer surface of the annular member 25 is provided with a plurality of radially arranged holes 41 which are adapted to receive a spanner wrench or steel bar. While the outer surfaces of the annular members 16 and 25 may be of any desired configuration, they are preferably cylindrical in configuration.

Since the annular radially outwardly exposed seats 19 and 27 are arranged intermediate the ends of the hydraulic tie rod nut structure 15, the shims 40 may be readily inserted between and removed from the annular seats 19 and 27. One or more sets of shims 40 may be utilized if desired, the use of two sets of shims 40 being illustrated in FIG. 2. The thicknesses of the shims 40 are so selected as to provide the desired amount of tension in the tie rods 12.

While for purposes of illustration one form of this invention has been disclosed, other forms thereof may become apparent to those skilled in the art upon reference to this disclosure and, therefore, this invention is to be limited only by the scope of the appended claims.

I claim:

1. In a power press having a frame and tie rods for the frame with screw threaded ends extending beyond the frame, a unitary hydraulic tie rod nut structure for encompassing the screw threaded ends of each tie rod and comprising, a pair of axially relatively movable annular members, one axial end of one of said annular members adapted to engage the frame radially outwardly from the screw threaded end of the tie rod and having an annular radially outwardly exposed seat at its other axial end, a relatively small diameter internal cylindrical surface adjacent said one axial end, a relatively large diameter internal cylindrical surface adjacent said other axial end, and an internal wall surface between said internal cylindrical surfaces, the other of said annular members having internal screw threads adapted to screw threadedly engage the screw threaded end of the tie rod, an annular radially outwardly exposed seat intermediate its axial ends adapted to engage the annular seat of said one annular member, a relatively small diameter external cylindrical surface adjacent one axial and thereof received in the relatively small diameter internal cylindrical surface of said one annular member, a relatively large diameter external cylindrical surface adjacent said annular seat and received in the relatively large diameter internal cylindrical surface of said one annular member, and an external wall surface between said external cylindrical surfaces and facing the internal wall surface of said one annular member to define an axially expansible chamber therebetween, said annular radially outwardly exposed seats on said one and other annular members preventing complete collapsing of said axially expansible chamber and preventing said one end of said other annular member from engaging the frame, sealing means between the relatively small diameter internal cylindrical surface of said one annular member and the relatively small diameter external cylindrical surface of said other annular member and between the relatively large diameter internal cylindrical surface of said one annular member and the relatively large diameter external surface of said other annular member for sealing said axially expansible chamber, means for applying hydraulic fluid pressure into said axially expansible chamber for axially expanding the same to axially separate said annular outwardly exposed seats and said annular members to apply tension in the tie rod, and shim means insertable between the axially separated annularly outwardly exposed seats of said axially separated annular members to maintain tension in the tie rod when the hydraulic fluid pressure is relieved from said axially expansible chamber.

2. The combination of claim 1, wherein the frame of the press is recessed where it is engaged by said one end of said one annular member.

3. The combination of claim 1, wherein said other annular member is provided with means to assist in rotating the same with respect to the threaded end of the tie rod.

4. The combination of claim 1, wherein said other annular member has a cylindrical circumferential surface and is provided with radially disposed holes for receiving a spanner wrench or steel bar to assist in rotating the same with respect to the threaded end of the tie rod.

5. The combination of claim 1, wherein one of said annular members has a passage extending from its external surface through the internal wall surface thereof into the axially expansible chamber for applying the hydraulic fluid pressure into said axially expansible chamber.

6. In a power press having a frame and tie rods for the frame with screw threaded ends extending beyond the frame, a unitary tie rod nut structure for encompassing the screw threaded ends of each tie rod comprising, a pair of axially relatively movable annular members, one of said annular members only being adapted to engage the frame and the other of said annular members being adapted to be screw threaded on the screw threaded end of the tie rod, said annular members having seats adapted to engage each other and having means defining a sealed axially expansible chamber therebetween, means for applying hydraulic fluid pressure into said axially expansible chamber for axially expanding the same to axially separate said seats and said annular members to apply tension in the tie rod, and shim means insertable between the axially separated seats of said axially separated annular members to maintain tension in the tie rod when the hydraulic fluid pressure is relieved from said axially expansible chamber.

7. The combination of claim 6, wherein the frame of the press is recessed where it is engaged by said one annular member.

8. The combination of claim 6, wherein said other annular member is provided with means to assist in rotating the same with respect to the threaded end of the tie rod.

9. The combination of claim 6, wherein one of said annular members has a passage extending therethrough for applying the hydraulic fluid pressure into said axially expansible chamber.

10. The combination of claim 1, wherein said wall surfaces defining said axially expansible chamber are conical surfaces.

11. The combination of claim 10, wherein said other annular member has a passage extending from its external surface through the internal wall surface thereof adjacent the top of said axial expansible chamber for applying hydraulic fluid pressure into said axially expansible chamber and for assisting in bleeding air therefrom.

(References on following page)

References Cited

UNITED STATES PATENTS

| | | | | |
|---|---|---|---|---|
| 2,571,265 | 10/1951 | Leufven | | 85—32 |
| 3,130,628 | 4/1964 | Blinn. | | |
| 3,154,006 | 10/1964 | Novak | | 100—214 XR |
| 3,353,397 | 11/1967 | Hoffmann | | 72—455 |

FOREIGN PATENTS 581,753   8/1933   Germany.

BILLY J. WILHITE, *Primary Examiner.*

U.S. Cl. X.R.

85—32